US010502376B2

(12) United States Patent
Ogg et al.

(10) Patent No.: US 10,502,376 B2
(45) Date of Patent: *Dec. 10, 2019

(54) LUMINAIRE WITH INDEPENDENTLY CONTROLLED LIGHT OUTPUT

(71) Applicant: Hubbell Incorporated, Shelton, CT (US)

(72) Inventors: Jeremy W. Ogg, Rockland, MA (US); Derek B. Baker, Middleboro, MA (US); Michael J. Centazzo, Franklin, MA (US); Cory A. Passerello, Plymouth, MA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,549

(22) Filed: Oct. 1, 2018

(65) Prior Publication Data
US 2019/0032875 A1    Jan. 31, 2019

Related U.S. Application Data

(63) Continuation of application No. 15/142,599, filed on Apr. 29, 2016, now Pat. No. 10,088,117.

(60) Provisional application No. 62/156,064, filed on May 1, 2015.

(51) Int. Cl.
F21S 8/04        (2006.01)
H05B 33/08       (2006.01)
(Continued)

(52) U.S. Cl.
CPC .............. F21S 8/043 (2013.01); F21S 8/036 (2013.01); F21S 8/06 (2013.01); F21V 7/0016 (2013.01);
(Continued)

(58) Field of Classification Search
CPC ... F21S 8/043; F21S 8/036; F21S 8/06; F21V 7/0016; F21V 23/009; F21V 21/03; H05B 33/0854; F21Y 2103/00; F21Y 2115/10
USPC ....................................................... 315/297
See application file for complete search history.

(56) References Cited

U.S. PATENT DOCUMENTS 9,423,113 B2    8/2016  Myers
2005/0231133 A1  10/2005  Lys
(Continued)

Primary Examiner — Don P Le
(74) Attorney, Agent, or Firm — Michael Best & Friedrich, LLP

(57) ABSTRACT

A light fixture includes a housing having a first side and a second side opposite the first side. The light fixture further includes a first light board coupled to the first side. The first light board has at least one light emitting element emitting a first light output in a first direction. The light fixture further includes a second light board coupled to the second side. The second light board has at least one light emitting element emitting a second light output in a second direction. The light fixture further includes a first driver supported by the housing and in electrical communication with the first light board. The first driver is operable to control the first light output. The light fixture further includes a second driver supported by the housing and in electrical communication with the second light board. The second driver is operable to control the second light output.

9 Claims, 10 Drawing Sheets

Related U.S. Application Data

(51) Int. Cl.

| | | |
|---|---|---|
| *F21V 21/03* | (2006.01) | |
| *F21V 23/00* | (2015.01) | |
| *F21S 8/00* | (2006.01) | |
| *F21S 8/06* | (2006.01) | |
| *F21V 7/00* | (2006.01) | |
| *F21Y 103/00* | (2016.01) | |
| *F21Y 115/10* | (2016.01) | |

(52) U.S. Cl.
CPC ............ *F21V 21/03* (2013.01); *F21V 23/009* (2013.01); *H05B 33/0854* (2013.01); *F21Y 2103/00* (2013.01); *F21Y 2115/10* (2016.08)

(56) References Cited

U.S. PATENT DOCUMENTS

| | | |
|---|---|---|
| 2009/0079357 A1 | 3/2009 | Shteynberg |
| 2011/0178977 A1* | 7/2011 | Drees .................... G05B 15/02 |
| | | 706/52 |
| 2012/0020092 A1 | 1/2012 | Bailey |
| 2012/0224371 A1* | 9/2012 | Hsueh .................... F21K 9/232 |
| | | 362/235 |
| 2013/0093325 A1 | 4/2013 | Scarpelli |
| 2013/0107527 A1* | 5/2013 | Boyer .................... F21V 7/005 |
| | | 362/241 |
| 2013/0188347 A1 | 7/2013 | Bryan et al. |
| 2014/0168287 A1 | 6/2014 | Wallener et al. |
| 2014/0293603 A1 | 10/2014 | Barnard |

* cited by examiner

LUMINAIRE WITH INDEPENDENTLY CONTROLLED LIGHT OUTPUT

CROSS-REFERENCE TO RELATED APPLICATION

This application is a continuation of co-pending, prior-filed U.S. patent application Ser. No. 15/142,599, filed Apr. 29, 2016, which claims the benefit of U.S. Provisional Patent Application No. 62/156,064, filed May 1, 2015. The entire contents of these applications are incorporated by reference herein.

BACKGROUND

The present application relates to light fixtures, and more specifically to programmable light fixtures.

Indirect/direct luminaires typically have two or more light sources to provide a direct light output and an indirect light output. The luminaires may be suspended from a ceiling or mounted on a wall, such that the direct light output is oriented toward a floor and the indirect light output is oriented toward a ceiling.

SUMMARY

In one aspect, a light fixture includes a housing having a first side and a second side opposite the first side. The light fixture further includes a first light board coupled to the first side. The first light board has at least one light emitting element emitting a first light output in a first direction. The light fixture further includes a second light board coupled to the second side. The second light board has at least one light emitting element emitting a second light output in a second direction. The light fixture further includes a first driver supported by the housing and in electrical communication with the first light board. The first driver is operable to control the first light output. The light fixture further includes a second driver supported by the housing and in electrical communication with the second light board. The second driver is operable to control the second light output.

In another aspect, a light fixture includes a housing, a first light assembly, and a second light assembly. The housing includes a first side and a second side opposite the first side. The first light assembly includes a first light board coupled to the first side. The first light board has at least one light emitting element emitting a first light output, and the first light output exhibits a first light distribution. The second light assembly includes a second light board coupled to the second side. The second light board has at least one light emitting element emitting a second light output, and the second light output exhibits a second light distribution.

In yet another aspect, a method for optimizing a light fixture, or luminaire, includes determining a required first light output and a second light output of a first light assembly and a second light assembly of the light fixture. The method further includes setting a first intensity of the first light output, and setting a second intensity of the second light output.

Other aspects of the application will become apparent by consideration of the detailed description and accompanying drawings.

DETAILED DESCRIPTION

Figure 1:
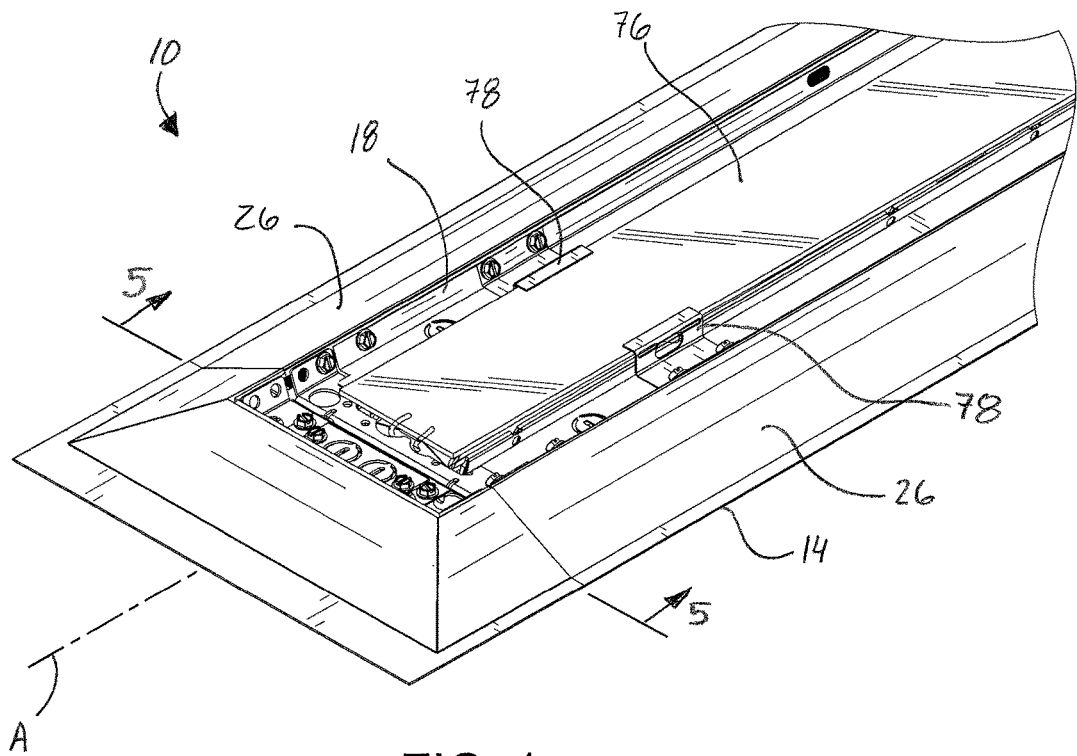
FIG. 1 is an upper perspective view of a portion of a light fixture.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Also, it is to be understood that the phraseology and terminology used herein is for the purpose of description and should not be regarded as limiting. As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

FIGS. 1-8 illustrate several programmable luminaires or light fixtures 10 according to one or more embodiments of the application. In particular, an indirect/direct (VD) programmable luminaire is shown that emits light in a first direction (e.g., an upward direction) from the light fixture 10 and also emits light from the light fixture in a second direction opposite the first direction (e.g., a downward direction). Referring to FIGS. 1-5, the light fixture 10 includes at least one housing 14 having a longitudinal axis A. The housing 14 further has a first, upper channel portion 18, a second, lower channel portion 22, and side portions 26 extending along the axis A. The side portions 26, the upper channel portion 18, and the lower channel portion 22 define an interior space 30. In the illustrated embodiment, the side portions 26 each have upper and lower converging walls that generally define a sideways wedge or "V" shape. The housing further includes an end cap flange 34 at each distal end of the housing 14. The housing 14 may be mounted to a wall (e.g., by wall mounting brackets—FIG. 10) or a ceiling (e.g., by pendants—FIGS. 11-12).

Figure 2:
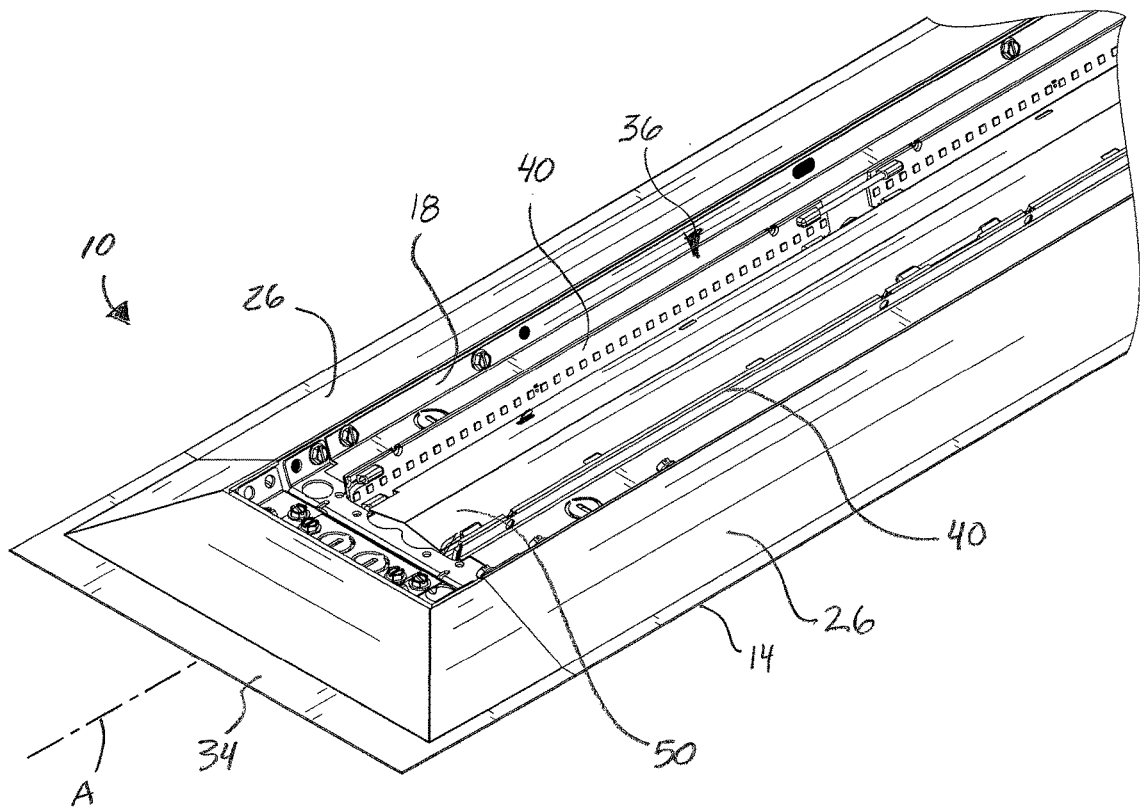
FIG. 2 is an upper perspective view of the portion of the light fixture of FIG. 1, shown with a dust cover removed.
Figure 5:
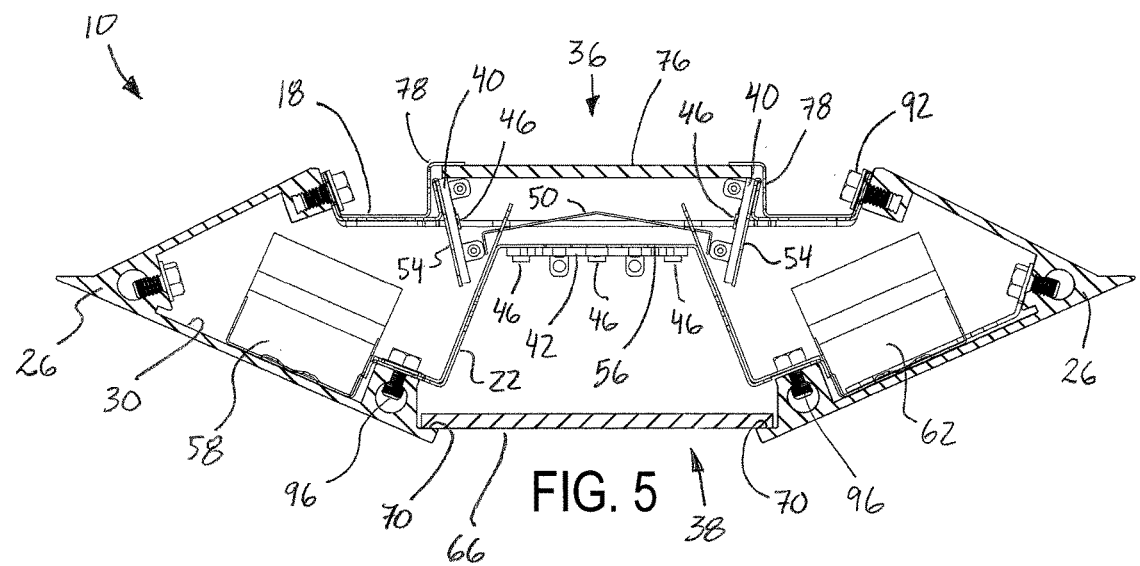
FIG. 5 is a cross-sectional view of the light fixture of FIG. 1 through line 5-5 in FIG. 1.

With continued reference to FIGS. 2 and 5, the light fixture 10 further includes a first or indirect light assembly 36 having a pair of first or indirect light boards 40 and a second or direct light assembly 38 having a second or direct light board 42. In some embodiments, the indirect light assembly 36 may include fewer or more indirect light boards 40 and the direct light assembly 38 may include more than one direct light board 42. The indirect light boards 40 and the direct light boards 42 each include a plurality of light emitting elements 46, such as light emitting diodes (LEDs). The LEDs 46 generally emit light in a semi-spherical lambertian distribution.

Figure 4:
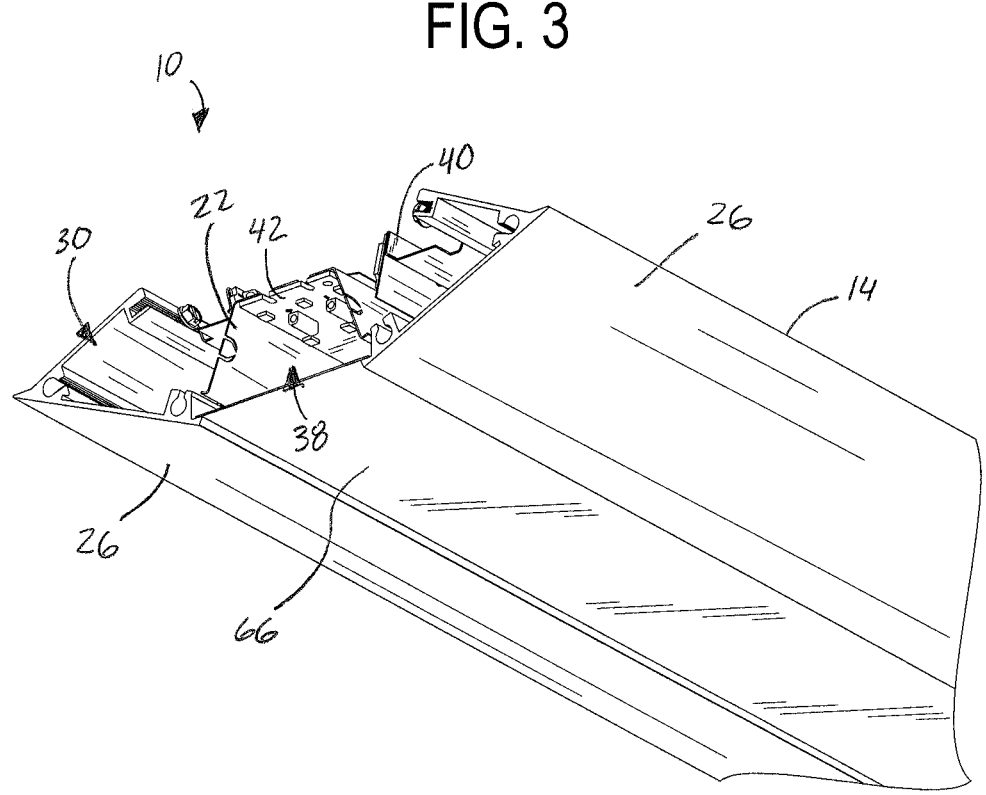
FIG. 4 is a lower perspective view of the portion of the light fixture of FIG. 1, shown with a dust cover and an end cap flange removed.

As best shown in FIGS. 2 and 4, each of the indirect light boards 40 and the direct light board 42 is a generally continuous board, in which the LEDs 46 are generally spaced apart along a length of the light boards 40, 42, such that emitted light extends along the length of the light boards 40, 42. In the illustrated embodiment, each of the indirect light boards 40 and direct light board 42 is made of a plurality of lights boards connected in series to extend the entire length of the light fixture 10. In some embodiments, the boards 40, 42 may each be a single continuous board that extends the entire length of the light fixture 10. In other embodiments, each of the indirect light boards 40 and the direct light board 42 may be a breakable light board that includes multiple sections that are connected together by perforated or frangible connecting portions, such as described in U.S. application Ser. No. 15/097,946, filed Apr. 13, 2016, which is incorporated herein by reference.

In some embodiments, when the light fixture 10 is hung from a ceiling or mounted to a wall, the light fixture is generally oriented such that the LEDs 46 of the indirect light boards 40 of the indirect light assembly 36 emit light upwards toward a ceiling (i.e., indirect light output), and the LEDs 46 of the direct light boards 46 emit light downwards toward a floor (i.e., direct light output) from the direct light boards 46.

Figure 13:
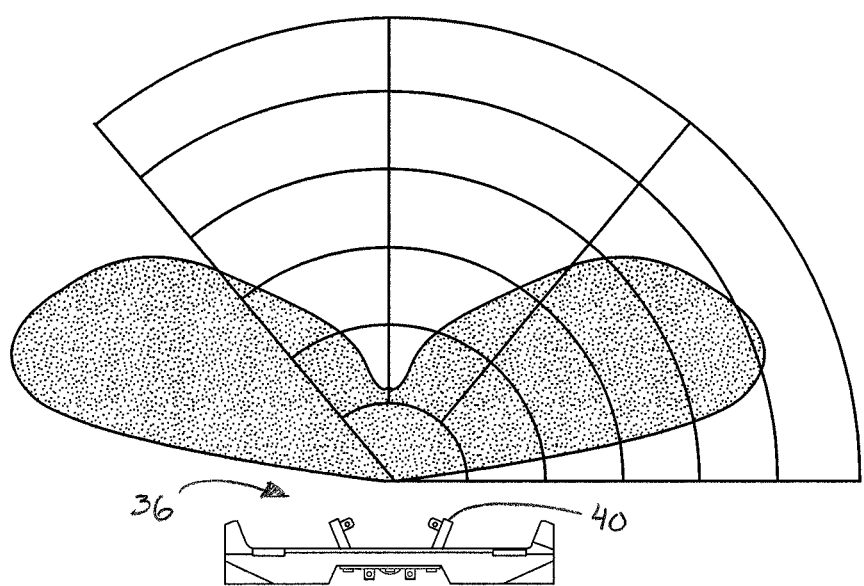
FIG. 13 illustrates a low peak angle light distribution for indirect lighting in accordance with one or more embodiments.

The indirect light assembly 36 of the light fixture 10 of FIGS. 1-5 is arranged in a low peak angle distribution configuration. The indirect light assembly 36 of the light fixture 10 further includes a reflector 50 that is positioned within the upper channel portion 18 and extends along the length of the housing 14. A row of indirect light boards 40 is arranged on each side of the reflector 50 coupled to an indirect light board bracket 54 within the upper channel portion 18 and arranged to extend parallel to the longitudinal axis A of the housing 14. In the illustrated embodiment, the indirect light board brackets 54 are integral to the upper channel portion 18. Each of rows of the indirect light boards 40 is in facing relation with one another and is oriented at an obtuse angle with a bottom surface 52 of the upper channel portion 18 so that each of the rows of indirect light boards 40 directs a beam at a low angle out of the upper channel portion 18 (e.g., in a slightly upward direction at the ceiling). In addition, some light is diffusely reflected by the reflector 50 and directed toward the ceiling to increase the efficacy. In this configuration of the indirect light assembly 36, the indirect light output from the LEDs 46 of the indirect light boards 40 has a low peak angle light distribution (FIG. 13). In other embodiments of the indirect light assembly 36, the indirect light boards 40 may be arranged in a different configuration to provide a different distribution based on, among other things, environmental considerations (i.e., ceiling height and fixture spacing) and desired lighting conditions.

Figure 15:
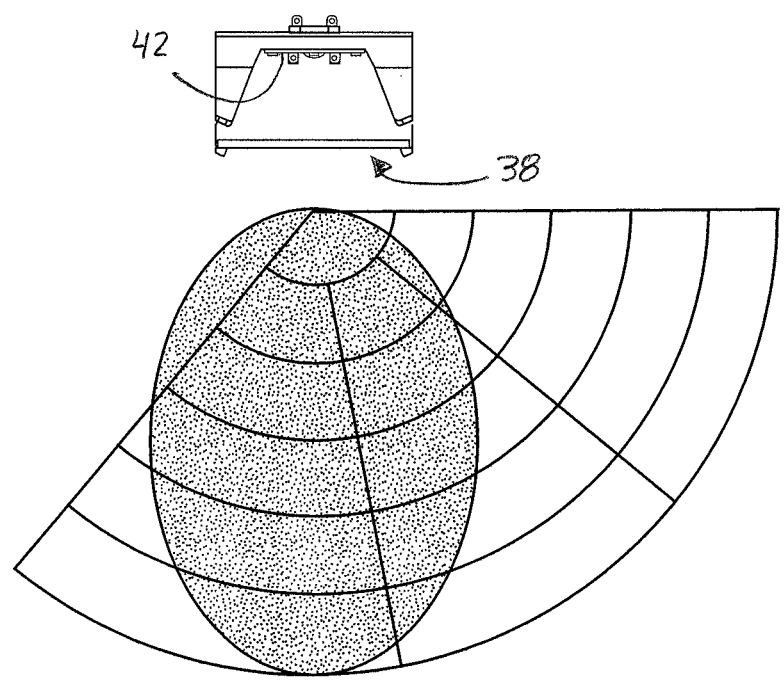
FIG. 15 illustrates a light distribution for direct lighting in accordance with one or more embodiments.

The direct light assembly 38 of the light fixture 10 of FIGS. 1-5 is arranged in a high efficacy distribution configuration. The direct light board 42 is coupled longitudinally along a lower surface 56 of the lower channel portion 22 and extends parallel to the longitudinal axis A. The direct light board 42 includes three parallel rows of LEDs 46. The direct light board 42 emits light away from the indirect light board (e.g., downwardly). In some embodiments, the direct light board 42 emits light out of the lower channel portion 22 and towards the floor. Side walls of the lower channel portion 22 include reflective surfaces to concentrate and increase the efficacy of the direct light output from the LEDs 46 of the direct light board 42. In this configuration of the direct light assembly 38, the direct light output from the LEDs 46 of the direct light board has a high efficacy distribution (FIG. 15). The direct light boards 42 may be arranged in other configurations to provide a different distribution based on, among other things, environmental considerations (i.e., ceiling height and fixture spacing) and desired lighting conditions.

With continued reference to FIG. 5, the light fixture 10 further includes a first or indirect light driver 58 and a second or direct light driver 62 that are positioned within the interior 30 of the housing 14 and supported by the side portions 26. The indirect light driver 58 is in electrical communication with the indirect light boards 40. The direct light driver 54 is in electrical communication with the direct light boards 42. The indirect light driver 58 independently controls the indirect light boards 40, while the direct light driver 62 independently controls the direct light board 42, respectively. The indirect light driver 58 and the direct light driver 62 can control an intensity of the indirect light output of the indirect light board 40 and an intensity of the direct light output of the direct light board 42 by varying voltage to provide various power levels to the light boards 40, 42. In certain configurations, the indirect light driver 58 and the direct light driver 62 are configurable drivers, each having at least a first configuration and a second configuration. In certain embodiments, the indirect light driver 58 is programmed to a first configuration and the direct light driver 62 is programmed to a second configuration. In certain configurations, the second configuration provides higher current output than the first configuration or vice versa. In certain embodiments, the indirect light driver 58 and direct light driver 62 are the same type or model of configurable driver. In one embodiment, each of the drivers 58, 62 is an OSRAM OT50 driver. In other embodiments, the indirect light drivers 58 and the direct light drivers 62 may be any suitable LED driver, including a constant DC current output driver or a constant voltage output driver. In one embodiment, the driver has dimming capability.

Figure 3:
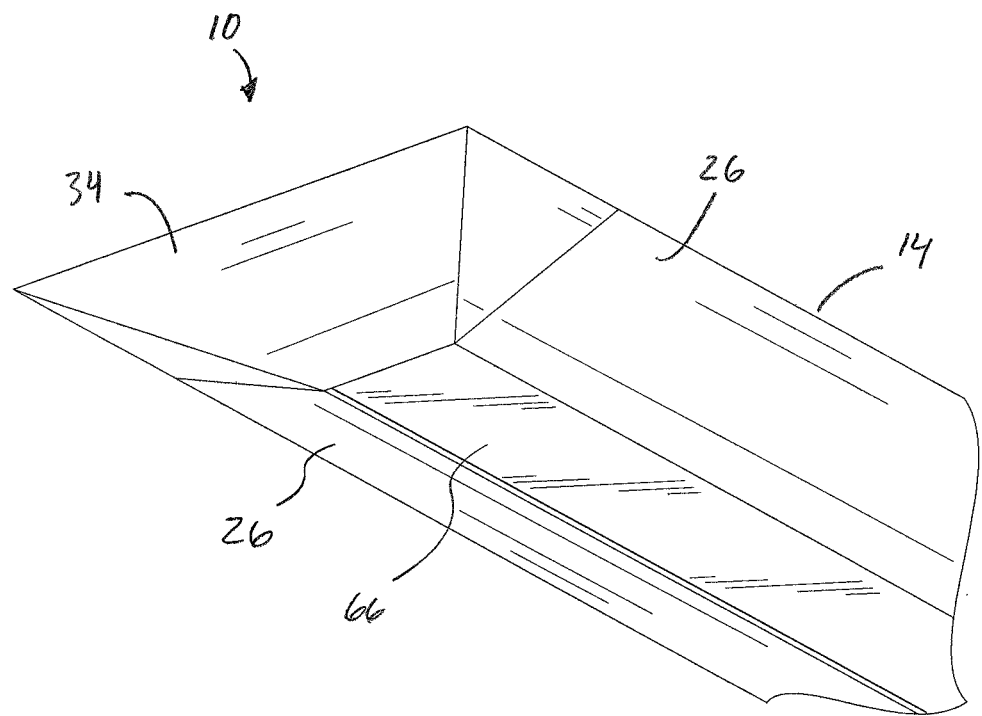
FIG. 3 is a lower perspective view of the portion of the light fixture of FIG. 1.

With reference to FIGS. 3-5, the light fixture 10 further includes a diffuser lens 66 that is supported opposite the direct light board 42 in front of the lower channel portion 22 by lips 70 defined by each of the side portions 26. The diffuser lens 66 extends along the length of the housing 14. The diffuser lens 66 scatters the direct light output from the LEDs 46 of the direct light boards 46 exiting the lower channel portion 22 to create soft lighting conditions. In some embodiments, the diffuser lens 66 may simply be a transparent lens and may be made of acrylic, glass, or another suitable material. In other embodiments (e.g., FIG. 8), the diffuser lens 66 may be substituted with a combination of a baffle 72 with a lens overlay 74 to further diffuse the light emitted by the LEDs 46 of the direct light boards 42. In still other embodiments, the light fixture may not include any lens.

With reference to FIGS. 1 and 5, the light fixture 10 further includes a dust cover 76 that is supported by at least one pair of dust cover support brackets 78 within the upper channel portion 18. The dust cover 76 extends along the length of the housing 14 and is spaced from a bottom surface 52 of the upper channel portion 18 by the dust cover support brackets 78. The dust cover 76 is positioned over the indirect light boards 40 to inhibit dust and other foreign matter from accumulating on the indirect light boards 40 and corresponding LEDs 46. The dust cover 76 may be transparent or translucent, and may act as a diffuser so as to "soften" the indirect light output from the LEDs 46 of the indirect light boards 40. In some embodiments, the light fixture 10 may not include the dust cover 76, as shown in FIG. 2.

The light fixture 10 (i.e., the boards 40, 42 and the drivers 58, 62) is electrically connected to an AC power source (e.g., mains) by a power cord. Alternatively or in addition, a battery may be used to provide power to the lighting fixture 10.

Figure 6:
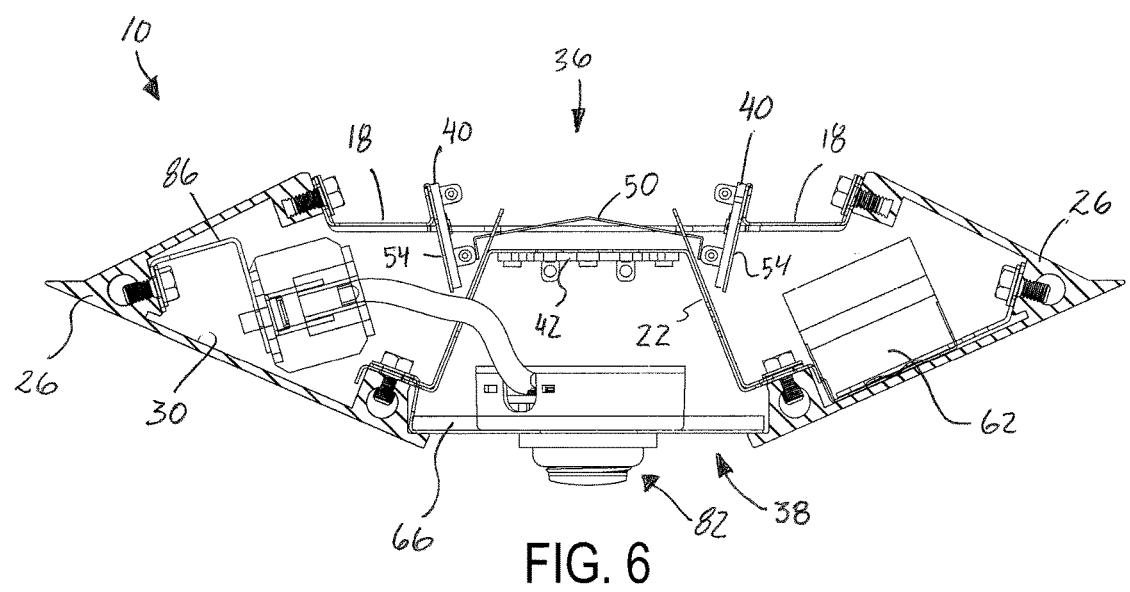
FIG. 6 is a cross-sectional view of the light fixture in accordance with another embodiment.

Referring to FIG. 6, in some embodiments, the lighting fixture 10 may further include a daylight photosensor 82. The photosensor 82 is positioned within the lower channel portion 22 and is supported by the lips 70 adjacent the diffuser lens 66, and is oriented to face downwardly from the light fixture 10. However, in other embodiments the photosensor 82 may be positioned anywhere on the light fixture 10 and in any orientation that facilitates sensing of ambient light. The photosensor 82 receives power from a power pack 84 located within the interior 30 of the housing 14 and supported by a power pack bracket 86. The power pack 84 may receive power from the mains. The photosensor 82 may be electrically connected to one or both of the indirect light and direct light drivers 58, 62 to control one or both of the indirect light boards 40 and the direct light boards 42. The photosensor 82 is operable to sense ambient light (i.e., daylight) levels and control the intensity of the light emitted by the LEDs 46 of one or both of the indirect light boards 40 and the direct light boards 42, accordingly. In one embodiment this is done by sending a signal from photosensor 82 to the drivers 58, 62 to increase or decrease the respective intensity. For example, if the photosensor 82 detects a level of ambient light above a predefined threshold, the LEDs 46 are dimmed by the drivers 58, 62; if a relatively lower amount of ambient light is detected, the intensity of light emitted by the LEDs 46 is increased. Alternatively, according to further embodiments the photosensor 82 is connected directly to the indirect light and direct light boards 40, 42 for controlling the intensity of the LED modules. The daylight photosensor 82 further increases the efficiency of the light fixture 10.

Figure 7:
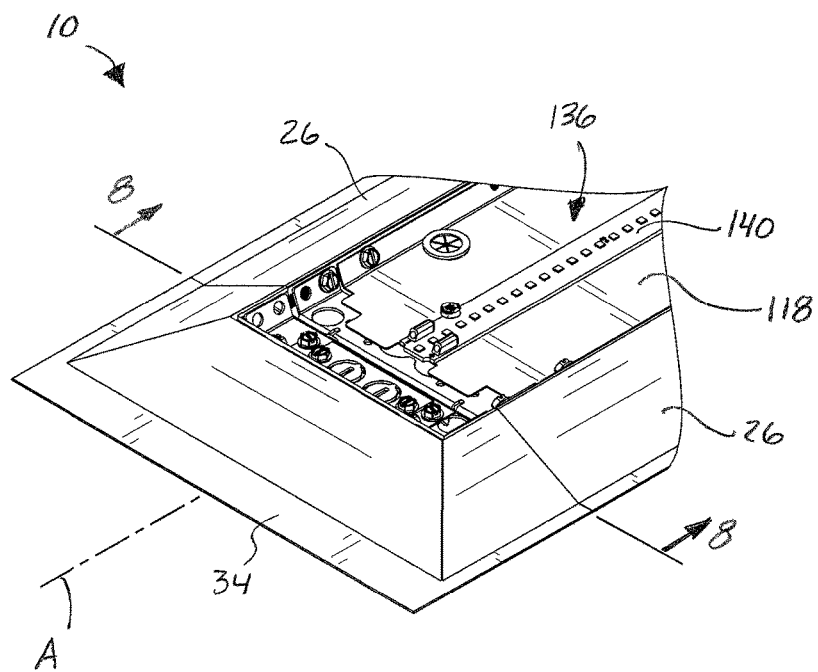
FIG. 7 is an upper perspective view of a portion of a light fixture in accordance with another embodiment.
Figure 8:
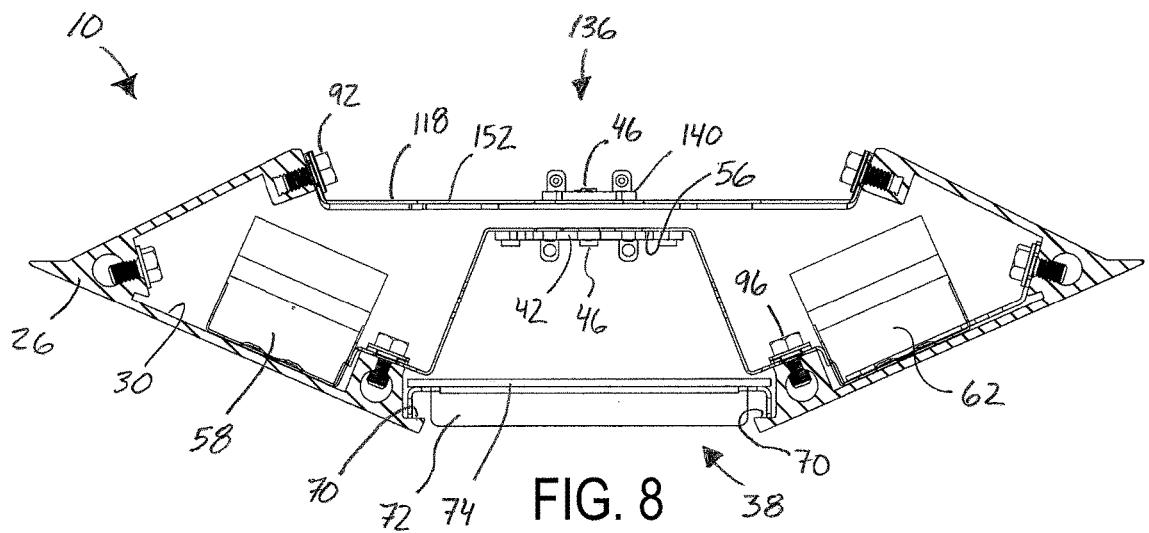
FIG. 8 is a cross-sectional view of the light fixture of FIG. 7 through line 8-8 in FIG. 7.
Figure 9:
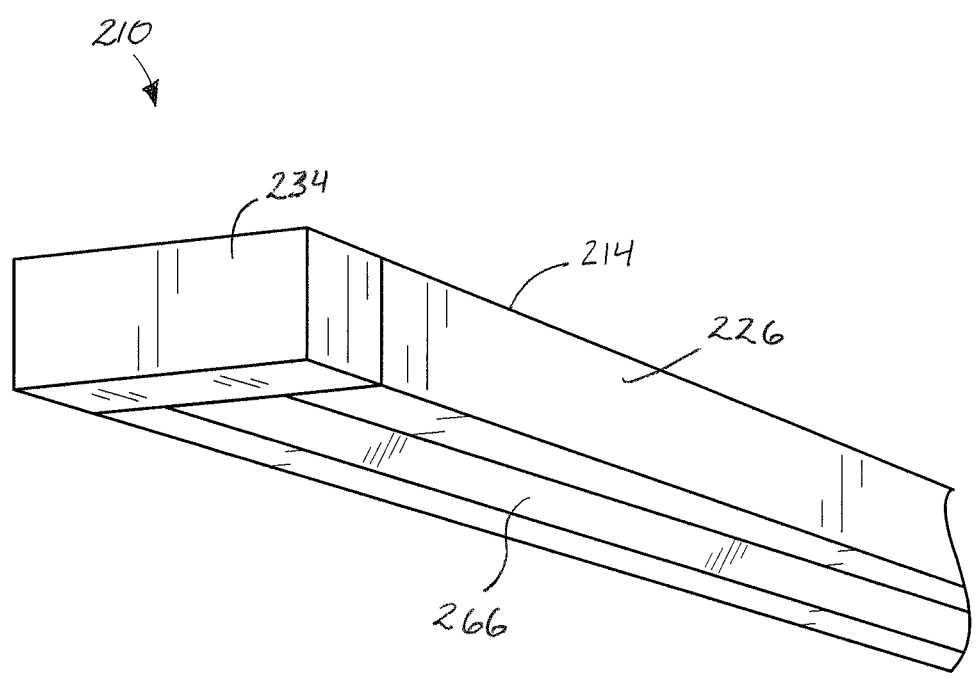
FIG. 9 is a lower perspective view of a portion of a light fixture in accordance with another embodiment.
Figure 14:
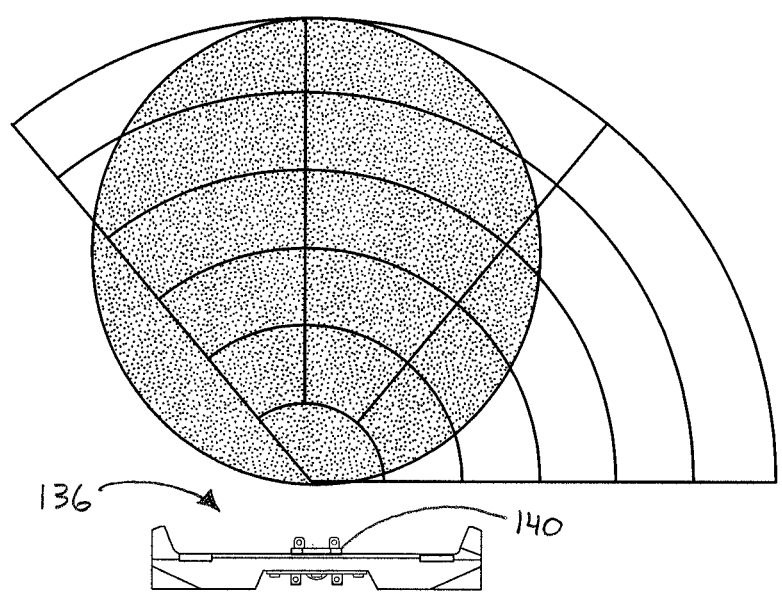
FIG. 14 illustrates a standard light distribution for indirect lighting in accordance with one or more embodiments.

As described above and shown in FIGS. 2 and 5, the indirect light assembly 36 is arranged in a first, low peak angle distribution configuration to produce an indirect light output that is aimed upwardly towards a ceiling in a generally low peak angle distribution as shown in the graph in FIG. 13. FIGS. 7-8 illustrate another embodiment of the light fixture 10 including an indirect light assembly 136 arranged in a second, standard distribution configuration, in which a single row of indirect light boards 140 may be positioned longitudinally along a bottom surface 152 of a upper channel portion 118 parallel to the longitudinal axis A of the housing 14. The indirect light boards 140 are oriented such that the indirect light output emitted by the LEDs 46 is directed upwardly out of the upper channel portion 118 along a vertical axis perpendicular with the bottom surface 152 of the upper channel portion 118. In this configuration of the indirect light assembly 36, the indirect light output emitted by the indirect light boards 40 has a standard (lambertian) distribution as shown in the graph in FIG. 14.

In the embodiment illustrated in FIGS. 1-8 the light fixture 10 illustrates aspects of knife-type light fixtures. In other embodiments (FIGS. 9-12), the light fixture 10 may be a rail-type light fixture 210. The knife-type light fixture 10 and the rail-type fixture 210 provide a range of light outputs, light distribution patterns, and fixture designs. The primary difference being the shape of the housing 214 and in particular the shape of the side portions 226, which have a rectangular channel shape. The boards 40, 42, the drivers 58, 62, and other features described above with respect to the knife-type light fixture may be incorporated into the rail-type light fixture 210 embodiment of FIGS. 9-12, and vice versa.

Figure 10:
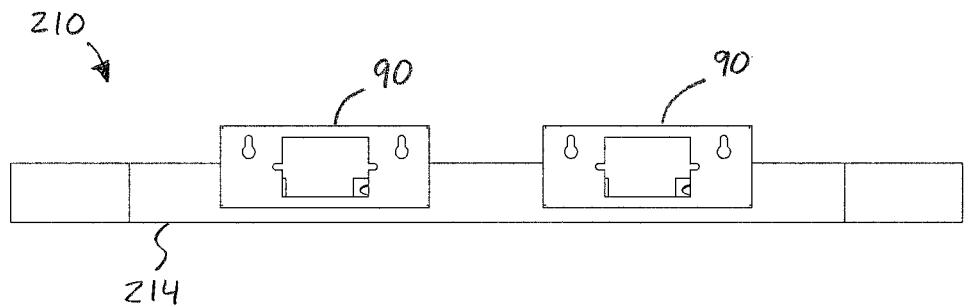
FIG. 10 is a side view of the light fixture of FIG. 9 including wall mounting brackets.
Figure 11:
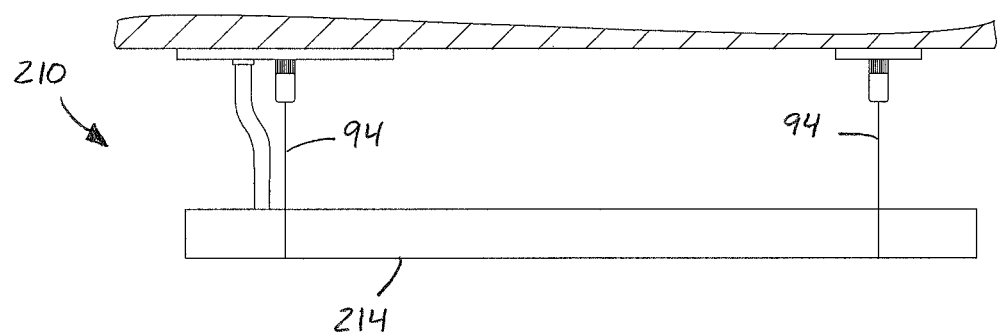
FIG. 11 is a side view of the light fixture of FIG. 9 including pendants for ceiling mounting.
Figure 12:
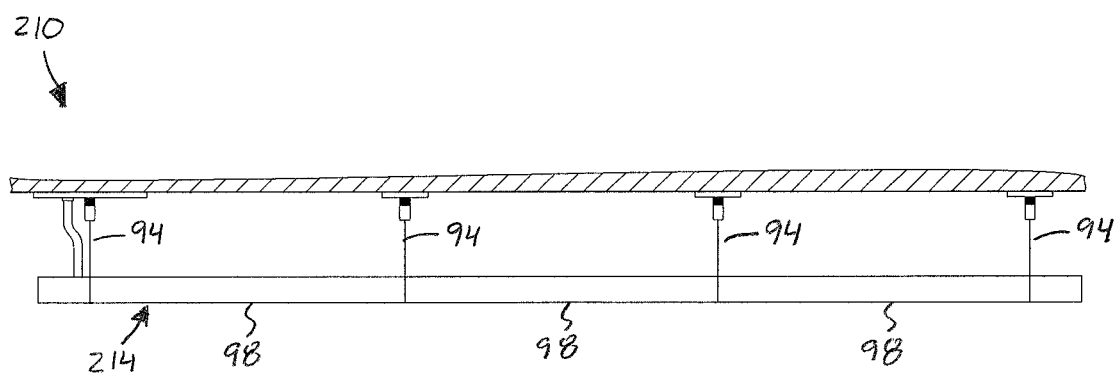
FIG. 12 is a side view of the light fixture of FIG. 9 including multiple housing sections aligned end-to-end.

Referring to FIG. 10, the housing 214 of the light fixture 210 may be mounted to a wall by brackets 90. Alternatively, the light fixture 210 may be suspended from a ceiling by pendants 94, as shown in FIG. 11-12. In other embodiments, the light fixture 210 may be mounted to a wall or a ceiling in another suitable manner. The light fixture 210 may also be supported by an independent or freestanding structure. The knife-type light fixtures 10 of FIGS. 1-8 may also be supported by the brackets 90 or the pendants 94.

With reference to FIG. 12, the housing 214 of the light fixture 210 may be made of multiple sections 98. In the illustrated embodiment, each of the sections 98 has a length of approximately 4 feet. In other embodiments, each section 98 may be approximately 3 feet long, approximately 6 feet long, approximately 8 feet long, or any other suitable length. The multiple sections 98 may be connected together, e.g., via dowels and/or fasteners. The drivers 58, 62 and boards 40, 42 of each section 98 may be electrically connected together so that only one power source is required to power the light boards 40, 42 of the sections 98 of the light fixture 10. In such an embodiment, the diffuser lenses 66 of each section directly abut each other end-to-end to provide a seamless appearance and continuous linear light along the length of the housing 14. Similarly, the dust covers 76 of each section may directly abut one another end-to-end along the length the housing 14. Although, FIG. 7 illustrates the rail-type light fixture 210, the knife-type light fixture 10 of FIGS. 1-8 may also be made of multiple sections.

During assembly, the indirect light assembly 136 and the direct light assembly 38 may be independently arranged in different configurations to produce different light distribution patterns for optimizing the light output for various environmental conditions. In the embodiment of FIGS. 7-8, the indirect light assembly 136 of the light fixture 10 is arranged in the standard distribution configuration so that the indirect light output has a standard light distribution as shown in the graph in FIG. 14. In this configuration of the indirect light assembly 136, during operation, the LEDs 46 of the single row of indirect light boards 140 emit light in a generally lambertian distribution directly toward the ceiling, such that the indirect light output covers a relatively narrow surface area above the light fixture 10. In some embodiments, reflectors or optics may be provided to narrow the indirect light output.

Alternatively, in the embodiment of FIGS. 2 and 5, the indirect light assembly 36 of the light fixture 10 is arranged in the low peak angle distribution configuration so that the indirect light output has a low peak angle light distribution as shown in the graph in FIG. 13. In this configuration of the indirect light assembly 36, during operation, the LEDs 46 of each of the rows of indirect light boards 40 emit light at a low angle toward the ceiling, such that the indirect light output has two peak intensities that are spaced by an angle of approximately 112.5 degrees, thereby covering a wider surface area while having a shallower depth (i.e., a lower efficacy range) than the standard distribution. In some embodiments, the rows of the indirect light boards 40 may be arranged at different angles, such that peak intensities are spaced by a larger or smaller angle. Some of the direct light output emitted by each of the rows of indirect light boards 40 diffusely reflects off the reflector 50 to further distribute the light and increase the efficacy. The standard light distribution may be more suitable for higher ceilings (e.g., 16 feet high or more), while the low peak angle option may be more suitable for lower ceilings (e.g., 8 feet high).

In each of the embodiments shown in FIGS. 1-8, the direct light assembly 38 is arranged, independent of the indirect light assembly 36, in a high efficacy distribution configuration so that the direct light output has a high efficacy distribution as shown in the graph in FIG. 15. The LEDs 46 of the direct light boards 42 emit light toward the floor in a generally lambertian distribution. The light is reflected by the sidewalls of the lower channel portion 22 to narrow the direct light output. Accordingly, the direct light distribution pattern has a higher efficacy than the indirect light output of both configurations of the exemplary indirect light assembly 36, 136. However, in some embodiments, the direct light assembly 38 may be configured similar to the indirect light assembly 36 in the low peak angle distribution configuration (FIGS. 2 and 5) or the standard distribution configuration (FIGS. 7-8) so that the direct light output has a similar low peak angle light distribution or standard light distribution, or any other desirable distribution configuration.

The direct light boards 42 and indirect light boards 40 are easily removable and replaceable from the light fixture 10 while installed. The indirect light boards 40 are supported on the upper channel portion 18, and the upper channel portion 18 is removably coupled to the side portions 26, e.g., by fasteners 92 (FIGS. 2-3). The indirect light boards 40 can be removed and replaced by uncoupling the upper channel portion 18 from the side portions 26. Similarly, the direct light boards 42 are supported on the lower channel portion 22 that is coupled to the side portions 26, e.g., by fasteners 96. The direct light boards 42 can be removed and replaced by uncoupling the lower channel portion 22 from the side portions 26. In some embodiments, the configuration of the indirect light assembly 36 and the direct light assembly 38 may be simply changed by removing and replacing the upper channel portion 18 and the lower channel portion 22, respectively. For example, the upper channel portion 18 supporting the indirect light assembly 36 in the first, low peak angle distribution configuration (FIGS. 2 and 5) may be removed and replaced with an upper channel portion 118 supporting the indirect light assembly 136 in the second, standard distribution configuration (FIGS. 7-8).

Further during assembly, the indirect light driver 58 and the direct light driver 62 are independently programmed to provide control over the light output of the indirect light boards 40 and the direct light boards 42, respectively. For example, intensity may be independently specified for the light output of the direct light boards 42, and the same or a different intensity may be specified for the light output of the indirect light boards 40. The independent control of the boards 40, 42 allows an operator to optimize performance of the light fixture 10 depending on environmental conditions, such as ceiling height and desired illuminance. In one or more additional embodiments, a light intensity (i.e., illuminance) of the light output by the indirect light boards 40 or the direct light boards 42 is variable in increments of approximately 100 lumens per four feet (lm/4 ft). In other embodiments, the light intensity may be variable in increments of approximately 50 lm/ft. In some embodiments, the light intensity is variable between a minimum of approximately 1000 lm/4 ft to a maximum of approximately 4000 lm/4 ft (250-1000 lm/ft). The intensity of the direct light output by the direct light boards 42 may be variable between a minimum of approximately 600 lm/4 ft and a maximum of approximately 3500 lm/4 ft (150-875 lm/ft). In addition to independently controlling power output of the direct light boards 42 and the indirect light boards 40, independently specifying the light distribution pattern of the indirect and direct light output allows for further optimization, as well as maximum fixture efficacy.

According to various embodiments of this application, controlling the power transmitted to the fixture 10 to satisfy power density requirements increases energy efficiency. For example, the drivers 58, 62 may be programmed so that 70% of the power goes to the indirect light boards 40, while 30% of the power goes to the direct light boards 42. In certain configurations, the indirect light driver 58 and the direct light driver 62 are configurable drivers, each having at least a first and a second configuration. In certain embodiments, the indirect light driver 58 is programmed to a first configuration (e.g., providing 70% of full power) and the direct light driver 62 is programmed to a second configuration (e.g., providing 30% of full power).

Additionally, in some embodiments, the indirect and direct light drivers 58, 62 if at full power could exceed a predetermined maximum allowable power level (e.g., a maximum power rating for the fixture 10, or a maximum power level established by regulation such as an energy code). However, at least one of the indirect light driver 58 and the direct light driver 62 are configured to provide less than their full power rating such that the combined configured maximum power of the two drivers does not exceed the predetermined power level. In some embodiments, the indirect and direct light drivers 58, 62 are configured at a source such as a manufacturer or integrator or by an authorized installation technician.

The indirect light driver 58 and the direct light driver 62 allow for independent dimming of the light output of the indirect light boards 40 and the direct light boards 42. In one embodiment, a standard 0-10V driver provides a dimming range between 100% and 10%. In another embodiment, a driver may provide a dimming range between 100% and 5%. In other embodiments, the dimming range may be between 100% and 1%, or between 100% and 0%. In some embodiments, the drivers 58, 62 may be configured with the light boards 40, 42 for simultaneous dimming.

In one embodiment, a color temperature of the LEDs 46 of the light boards 40, 42 is determined based on a temperature LED chip (not shown) coupled to the light boards 40, 42 (the color temperature of the LEDs 46 of the direct light board 42 is determined in a similar manner by a temperature chip on the direct light boards 42). In one embodiment, the color temperature may be approximately 30K, 35K or 40K. In other embodiments, the color temperature of the indirect light boards 40 and/or the direct light boards 42 may be varied by populating each of the light boards 40, 42 with various color temperature chips and adjusting the drive current to each chip. In still other embodiments, the color temperature may be varied (e.g., by a dimmer/mixer) by adjusting a drive current to separate color temperature boards.

In one embodiment, the light fixture 10 is configured to have an end-of-life indicator feature. After one of the indirect light driver 58 and the direct light driver 62 reaches its programmed life-time, whenever the light fixture 10 is powered on. The one of the indirect light driver 58 and the direct light driver 62 that has reached its programmed life-time will stay at a "dim" level, in which intensity of a corresponding one of the indirect light output and the direct light output is decreased to 10% of its maximum for a predetermined amount of time (e.g., approximately 10 minutes) before slowly reaching its maximum power level. This serves to indicate to a user that the one of the indirect light driver 58 and the direct light driver 62 needs to be replaced soon.

Figure 16:
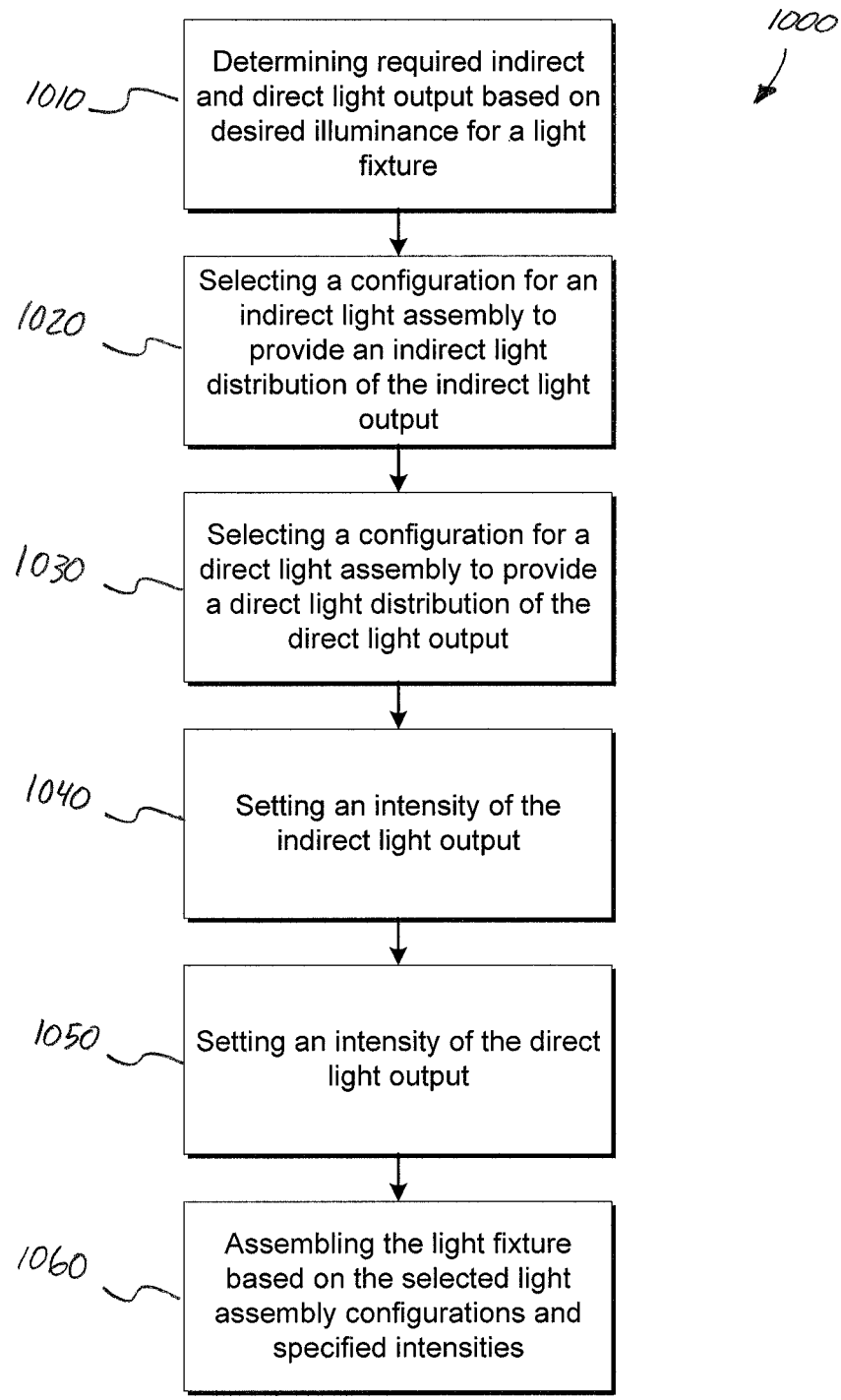
FIG. 16 illustrates a method for optimizing a programmable light fixture.

FIG. 16 illustrates a method 1000 for optimizing the light fixture 10 is provided. In step 1010, required light output (i.e., both indirect and direct light output) is determined based on desired illuminance for a specified environment with various environmental conditions and considerations. The environmental conditions and considerations may include, for example illumination area (i.e., area to be illuminated above and below light fixture 10), fixture spacing (i.e., spaced between adjacent light fixtures), and ceiling height.

In step 1020, a configuration of the indirect light assembly 36 is selected for the light fixture 10 based on a specified indirect light distribution for the indirect light output. The specified indirect light distribution may be driven by the required output for the specified environmental conditions. The configuration may be selected from a plurality of configurations including the standard distribution configuration and the low peak angle distribution configuration. The low peak angle distribution configuration may be selected for low ceiling heights and/or wide fixture spacing. Alternatively, the standard distribution configuration may be selected for high ceiling heights and/or narrow fixture spacing. In step 1030, a configuration of the direct light assembly 38 is selected for the light fixture 10 based on a specified direct light distribution for the direct light output. The specified direct light distribution may be determined by the required direct light output for the specified environmental conditions. In the illustrated embodiment, the high efficacy distribution configuration is shown.

In step 1040, an intensity of the indirect light output of the indirect light boards 40 of the indirect light assembly 36 is set by programming the indirect light driver 58 to control and provide power to the indirect light boards 40 to provide an intensity of the indirect light output. In step 1050, an intensity of the direct light output of the direct light boards 42 of the direct light assembly 38 is set by programming the direct light driver 62 to control power to the direct light boards 42 to provide a specified intensity for the direct light output. The intensity of each of the indirect light output and the direct light output may be increased or decreased independently for various reasons, such as to meet the desired illuminance for the environmental conditions and considerations. For example, the intensity of the indirect light output may be increased for high ceiling heights and decreased for low ceiling heights. In some embodiments, the power from the indirect light driver 58 and the direct light driver 62 in combination cannot exceed a maximum allowable power level.

In step 1060, the light fixture 10 is assembled based on the selected configurations for the indirect light assembly 36 and the direct light assembly 42, and the specified intensities for the indirect light output and the direct light output. This may include programming the indirect and direct light drivers 58, 62 to control the power to the indirect and direct light boards 40, 42 respectively. This may also include configuring the indirect and direct light assemblies 36, 38 in the specified configurations.

In one exemplary situation, by selecting the indirect light assembly 36 to be configured such that the indirect light output has a low peak angle distribution and specifying an increased intensity of the indirect light output, the light fixtures 10 may be spaced farther apart than if the indirect light assembly 136 is selected to be configured in the standard distribution configuration while still providing the same illuminance. That is, the same illuminance can be obtained while using fewer light fixtures. Decreasing the number of light fixtures results in less overall cost.

In another exemplary situation, the indirect light assembly 36 is arranged in the low peak angle distribution configuration for multiple light fixtures 10 in an exemplary space. By independently programming the indirect light driver 58 and the direct light driver 62 to increase the intensity of the indirect light output and decrease intensity of the direct light output, similar performance may be achieved using one less light fixture. Decreasing the number of light fixtures results in less overall cost.

In general, the light fixture includes indirect light and direct light LED boards that are independently controlled by programmable indirect light and direct light drivers and independently configured in different configurations to independently vary indirect and direct light output characteristics, such as light intensity and distribution pattern.

Although aspects have been described in detail with reference to certain preferred embodiments, variations and modifications exist within the scope and spirit of one or more independent aspects as described. Various features and advantages are set forth in the following claims.

What is claimed is:

1. A light fixture comprising:
   a housing having a first side and a second side opposite the first side;
   a first light emitting element providing an indirect light output, the indirect light output directed out from the light fixture in a first direction;
   a second light emitting element emitting a direct light output distinct from the indirect light output, the direct light output directed out from the light fixture in a second direction substantially opposite the first direction;
   a first driver supported by the housing and in electrical communication with the first light emitting element, the first driver operable to control a current supplied to the first light emitting element; and a second driver supported by the housing and in electrical communication with the second light emitting element, the second driver operable to control a current supplied to the second light emitting element.

2. The light fixture of claim 1, wherein a first intensity of the indirect light output of the is controlled by the first driver, and wherein a second intensity of the direct light output is controlled by the second driver.

3. The light fixture of claim 1, wherein a first intensity of the indirect light output and a second intensity of the direct light output are each independently controlled by modifying the currents supplied by the first and second drivers, respectively.

4. The light fixture of claim 1, wherein the first driver and the second driver are configurable drivers, each of the first and second drivers having at least a first configuration and a second configuration, and wherein the first driver is programmed to the first configuration and the second driver is programmed to the second configuration.

5. The light fixture of claim 1, wherein the first light emitting element is configured so that the indirect light output has a first light distribution, and wherein the second light emitting element is independently configured so that the direct light output has a second light distribution.

6. The light fixture of claim 5, wherein the first light emitting element is configured such that the first light distribution is one of a low peak angle light distribution and a standard lambertian light distribution, wherein the light fixture further includes a reflector arranged with the first light emitting element to diffusely reflect a portion of the indirect light output.

7. The light fixture of claim 1, wherein the first and second drivers are restricted from reconfiguration by a user.

8. The light fixture of claim 1, wherein the fixture is subject to a predetermined maximum allowable power level,
wherein the first and second drivers each have a respective maximum power rating, the sum of the maximum power rating for the first driver and the maximum power rating for the second driver exceeding the predetermined maximum allowable power level, and
wherein at least one of the first and second drivers is configured at less than its respective maximum power rating and such that, when the first and second drivers are so configured, the predetermined maximum allowable power level is not exceeded.

9. The light fixture of claim 1, wherein the first direction of the indirect light output is vertically upward and the second direction of the direct light output is vertically downward.

* * * * *